US011143620B2

(12) United States Patent
Hamilton

(10) Patent No.: US 11,143,620 B2
(45) Date of Patent: Oct. 12, 2021

(54) ELECTROMAGNETIC PROBE TESTING OF BOND COAT

(71) Applicant: Mitsubishi Power Americas, Inc., Lake Mary, FL (US)

(72) Inventor: Earnest W. Hamilton, Winter Garden, FL (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 19 days.

(21) Appl. No.: 16/438,943

(22) Filed: Jun. 12, 2019

(65) Prior Publication Data
US 2020/0393411 A1    Dec. 17, 2020

(51) Int. Cl.
*G01N 27/82* (2006.01)
*G01M 15/14* (2006.01)

(52) U.S. Cl.
CPC ............ *G01N 27/82* (2013.01); *G01M 15/14* (2013.01)

(58) Field of Classification Search
CPC ............................... G01N 27/82; G01M 15/14
See application file for complete search history.

(56) References Cited

U.S. PATENT DOCUMENTS

| 5,942,893 A * | 8/1999 | Terpay ............... G01N 27/9033 324/207.18 |
| 6,377,039 B1 | 4/2002 | Goldfine et al. |
| 6,534,975 B2 | 3/2003 | Beeck et al. |
| 7,161,351 B2 | 1/2007 | Goldfine et al. |
| 2004/0050180 A1* | 3/2004 | Abe ...................... G01D 5/2053 73/862.331 |
| 2006/0029723 A1* | 2/2006 | Rigney ................... C23C 10/60 427/8 |
| 2008/0079426 A1* | 4/2008 | Suzuki ................. G01N 27/902 324/238 |
| 2018/0191236 A1* | 7/2018 | Wagoner ............... H02M 1/126 |

* cited by examiner

*Primary Examiner* — Dominic E Hawkins
(74) *Attorney, Agent, or Firm* — Schwegman Lundberg & Woessner, P.A.

(57) ABSTRACT

A method for measuring a non-magnetic coating thickness upon a non-magnetic gas turbine component, such as a hot gas path component, can comprise applying a magnetic coating, such as a ferrous coating, upon the non-magnetic gas turbine component, applying a non-magnetic coating, such as a metallic bond coating, upon the magnetic coating, and measuring a thickness of the non-magnetic coating with a magnetic induction probe. The magnetic induction probe can be calibrated to the magnetic coating before the non-magnetic coating is applied. Measuring of the thickness of the non-magnetic coating can be used to validate spray patterns of automated spray processes. The magnetic and non-magnetic coatings can be stripped from the gas turbine component and used to validate additional spray patterns.

20 Claims, 4 Drawing Sheets

ELECTROMAGNETIC PROBE TESTING OF BOND COAT

TECHNICAL FIELD

This document pertains generally, but not by way of limitation, to non-destructive testing methods of coated components. More specifically, but not by way of limitation, the present application relates to systems and methods for testing thicknesses of non-magnetic coated components.

BACKGROUND

Gas turbine (GT) hot gas path (HGP) components are typically made of super alloys upon which a metallic bond coat (MBC) is applied. A non-metallic, typically ceramic, thermal barrier coating (TBC) can be applied upon the MBC. The MBC serves as an intermediate layer between the base material of the HGP component and the TBC to ensure adequate adhesion of the TBC to the HGP component.

The TBC insulates the HGP component from high temperature GT combustion gases. Proper functionality of the HGP components requires careful control of the thickness of the MBC and TBC upon the geometry of the HGP components. Too thin of a coating can decrease the effectiveness of the thermal barrier and durability of the component. Too thick of a coating can impact various aerodynamic parameters of the component, as well as increase processing time and cost.

The coatings are typically sprayed upon the HGP components via thermal deposition methods, such as high velocity oxygen fuel (HVOF) or atmospheric plasma spray (APS) methods. Spraying process parameters include robotic motion to move the spray gun and/or HGP component to obtain desired coating thicknesses at specific, application-dependent locations upon the HGP component geometry.

Examples of non-destructive testing of coated components are described in U.S. Pat. No. 6,377,039 to Goldfine et al.; U.S. Pat. No. 6,534,975 to Beeck et al; and U.S. Pat. No. 7,161,351 to Goldfine et al.

OVERVIEW

The present inventor has recognized, among other things, that problems to be solved in coating of HGP components with both a MBC and a TBC can include adequately verifying the thickness of a non-metallic TBC when applied over a conductive MBC on a non-magnetic HGP component, particularly for complex geometries.

Generally speaking, there are two non-contact measurement methods, eddy current and magnetic induction to inspect coating thickness on parts. 1) Eddy current is used to measure non-conductive coatings on a conductive base metal; and 2) Magnetic induction is used to measure non-magnetic coatings on a magnetic (i.e., ferrous) base metal. Eddy current non-contact measurement may be used to confirm appropriate TBC thicknesses. However, the MBC applied onto the HGP components is a conductive coating upon a non-magnetic substrate. Thus, the non-contact methods above are not suitable.

Other measurement methods involve the use of "coupons." Coupons are small pieces of flat, thin metal, having similar composition to the HGP components. The coupons are affixed, often via welding, to a "dummy" HGP component, and processed (e.g., coated with MBC) along with a batch of production (e.g., intended for use in a gas turbine) HGP components. After the coating step, the coupon(s) are removed from the dummy HGP component and cross-sectioned. The thickness of the MBC upon the cross-sectioned coupon is then measured and presumed to represent a proxy measurement of the MBC applied upon the production parts (in the same approximate location as the coupon). The dummy part can then stripped of the MBC, and new coupons re-attached for each batch.

This is a process evaluation and control measurement. It is impossible to measure the MBC upon a finished part, without somehow destroying or altering the part. Therefore, the MBC coating thickness upon coupons that have been processed with the dummy part and subject to the same process parameters as the production HGP components, is expected to be, at least substantially, the same as the MBC coating thicknesses upon the production HGP components. Therefore, the MBC coating thickness measurement upon the coupons is a proxy for the MBC coating thickness upon the production HGP components. However, HGP components have complex geometry that may require different coating thicknesses at different locations. Because coupons represent discrete locations upon any dummy part, and coupon geometry is not identical to the geometry of the production parts, coating thickness measurement of coupons does not exactly represent the actual coating thickness as applied at each location over the entirety of the geometry of the HGP component.

The present subject matter can help provide a solution to this problem and other problems, such as by providing methods and systems for measuring a non-magnetic coating thickness upon a non-magnetic gas turbine component by measuring the thickness of the non-magnetic coating, as applied over an intermediate magnetic coating, with a magnetic induction probe that has been calibrated to the magnetic coating.

Example methods of the present disclosure can include 1) spraying a GT HGP component having a non-ferrous, non-magnetic base material with a magnetic (ferrous) coating to create a magnetic layer thereupon, 2) applying a non-magnetic MBC over the magnetic coating, and then 3) using a magnetic induction measurement to confirm the proper MBC thickness for a batch of HGP components.

In an example, a method for measuring a non-magnetic coating thickness upon a non-magnetic gas turbine component can comprise applying a magnetic coating upon the non-magnetic gas turbine component, applying a non-magnetic coating upon the magnetic coating, and measuring a thickness of the non-magnetic coating with a magnetic induction probe.

In another example, a method of inspecting a coating thickness of a gas turbine component can comprise coating the gas turbine component with a metallic bond coating, validating the metallic bond coating with a testing tool, coating the gas turbine component with a non-magnetic thermal barrier coating, and measuring the non-magnetic thermal barrier coating with the testing tool.

In an additional example, a method for validating a spray pattern for a gas turbine component can comprise mounting the gas turbine component into a spray coating booth, applying a magnetic coating to the gas turbine component with an automated spray system of the spray coating booth according to a spray pattern, applying a non-magnetic coating over the magnetic coating with the automated spray system according to the spray pattern, measuring thicknesses of the non-magnetic coating at multiple locations with an induction probe to validate the spray pattern by identifying deficiencies in the coating, and revising the spray pattern to eliminate the deficiencies.

This overview is intended to provide an overview of subject matter of the present patent application. It is not intended to provide an exclusive or exhaustive explanation of the invention. The detailed description is included to provide further information about the present patent application.

Figure 1:
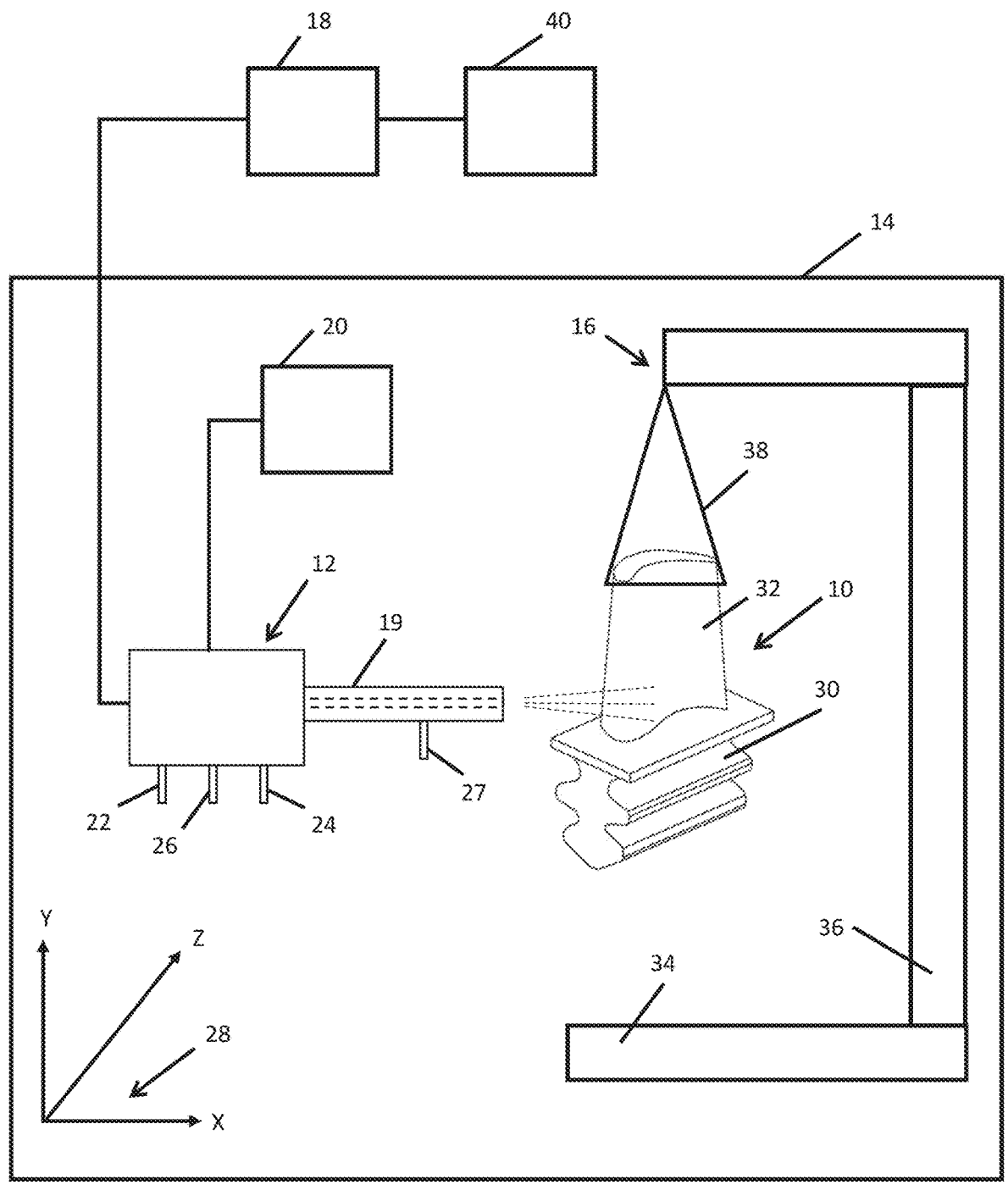
FIG. 1 is a schematic diagram illustrating a gas turbine component being sprayed with a magnetic coating using a thermal spray gun within a spray booth.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a schematic diagram illustrating gas turbine component 10 being sprayed with a coating using thermal spray gun 12. Thermal spray gun 12 can comprise a part of a spray system, which can comprise spray booth 14, part support 16 and controller 18. Thermal spray gun 12 can include spray nozzle 19 and can be connected to driver 20, oxygen inlet 22, fuel inlet 24, electrical input 26 and powder inlet 27. Part support 16 can hold gas turbine component 10 in relationship to coordinate system 28, which can comprise an X-direction, a Y-direction and a Z-direction. Gas turbine component 10 can comprise any component of a gas turbine engine that is subject to heat during operation of the gas turbine engine, which can be referred to as hot gas path (HGP) components. Although other non-hot gas path and non-gas turbine components can also be used in conjunction with the systems and methods of the present disclosure. In the illustrated example, gas turbine component 10 comprises a turbine blade having platform section 30 and airfoil section 32. Part support 16 can comprise any structure for supporting gas turbine component 10 in relationship to coordinate system 28. In the illustrated example, part support 16 can comprise base 34, stanchion 36 and hanger 38.

As mentioned, because gas turbine component 10 can be subject to elevated temperatures, which can exceed the melting point of the material used to produce gas turbine component 10, gas turbine component 10 can be coated with a thin layer of material that can withstand the operating environment of the gas turbine engine, such as a thermal barrier coating (TBC). Prior to coating with the thermal barrier coating, gas turbine component 10 can be coated with a metallic bond coat (MBC) to facilitate adhesion of the TBC to gas turbine component 10 via the MBC.

Spray booth 14 can be used to apply both the MBC and the TBC on gas turbine component 10. Spray booth 14 can comprise an enclosure for providing a stable environment for the application of the MBC and the TBC and for containing stray particles of coating. As such, spray booth 14 can comprise a plurality of panels, such as a combination of glass and metal panels that can provide the desired barrier while also permitting some visibility therethrough. The panels can be provided with doors for allowing part support 16 into and out of spray booth 14. As such, after each gas turbine component 10 has completed a spray process, the doors of spray booth 14 can open to allow gas turbine component 10 and part support 16 to leave and a new support and component to enter. Additionally, multiple instances of gas turbine component 10 can be mounted within spray booth 14 with the same part support 16 or multiple part supports 16.

Thermal spray gun 12 can be mounted in a mobile fashion within spray booth 14. For example, spray gun 12 can be coupled to driver 20 to move thermal spray gun 12 in three-dimensional space defined by coordinate system 28 relative to gas turbine component 10. Additionally, part support 16 can be configured to change the orientation of gas turbine component 10 within spray booth 14. In examples, thermal spray gun 12 can comprise an HVOF or atmospheric plasma spray gun. For example, fuel and oxygen can be delivered to a mixing chamber within thermal spray gun 12 via fuel inlet 24 and oxygen inlet 22, respectively, mixed and ignited, such as by an igniter connected to electrical input 26, to produce a flow of hot gas. A powder, such as powders for either the MBC or TBC, can be injected into nozzle 19 of thermal spray gun 12 at powder inlet 27 to produce a flow of molten particles that can be projected toward gas turbine component 10. Upon impact with gas turbine component 10, the molten particles can adhere to gas turbine component 10 to form a coating.

Driver 20 can comprise any suitable system for providing movement to thermal spray gun 12, such as a robotic arm having multiple universal joints, swivel joints, gimbal joints and the like. Driver 20 can be connected to controller 18, which can be coupled to storage system 40. Controller 18 can be configured to control movements of thermal spray gun 12 via controlling operation of driver 20. Controller 18 can comprise any suitable system, such as a computing system, a computer numerically controlled system, a programmable logic control system and the like. Controller 18 can be in communication with storage system 40. Storage system 40 can comprise any suitable storage system, such as volatile, non-transitory, or non-volatile tangible computer-readable media, including, but not limited to, hard disks, removable magnetic disks, removable optical disks (e.g., compact disks and digital video disks), magnetic cassettes, memory cards or sticks, random access memories (RAMs), read only memories (ROMs), and the like. Storage system 40 can be provided with instructions for operating driver 20. In particular, storage system 40 can be provided with a catalog or database of gas turbine components 10 of different geometries and associated instructions for thermal spray gun 12 to coat each component 10. For example, each gas turbine component 10 can have an associated path for thermal spray gun 12 to move along in coordinate system 28 to provide complete coverage of the MBC and the TBC. For example, instructions can include directions for moving to specific (x, y, z) coordinate locations, orienting spray nozzle 19 along specific spray trajectories and spraying a coating for periods of time. A series of these instructions can define a pattern over which driver 20 can move thermal spray gun 12 within spray booth 14. For identically shaped gas turbine components, the same set of spray instructions can be used. Likewise, the MBC and the TBC can utilize the same set of spray instructions with, however, the thicknesses potentially being different. As such, the set of spray instructions for each identically shaped component should result in each component having the same thickness of sprayed coatings within a prescribed tolerance band.

It can be desirable to apply the MBC and the TBC in an even manner to a desired depth to avoid adding unnecessary thickness to gas turbine component 10 while providing a minimum barrier to the operating environment. It can, however, be difficult to ensure the coatings are applied to the minimum thickness and without being overapplied, particularly in or near geometric features of gas turbine component 10 that are irregular or non-planar, such as at crevices and joint lines between surfaces, such as where platform portion 30 and airfoil portion 32 come together.

In order to check the accuracy of a programmed set of spray instructions, it can be desirable to physically inspect the resulting coatings applied to gas turbine component 10. However, as described above, it can be difficult to inspect the MBC when it is applied over a non-magnetic structure, particularly without damaging the coatings and the underlying component. With the systems and methods of the present disclosure, the MBC and TBC can be inspected and verified, thereby validating the set of spray instructions, without damaging the underlying component or the coatings.

Example inspection methods are described with reference to FIGS. 1-4. With reference to FIG. 1, at a first step, a "representative" HGP component can be first coated with a ferrous powder, such as FE-276-2 to provide a magnetic base. The "representative" HGP component can be a production HGP component or a component that well-represents the geometry of a production HGP components. In either case, the "representative" HGP component can be processed (e.g., coated with MBC) alongside production HGP components that are intended to be used in a gas turbine engine. In additional examples, the "representative" HGP component can be an actual production HGP component that may, for some reason, have been determined to be "scrap" or otherwise unusable, but that still maintains the overall geometry of gas turbine component 10. For example, a production part may become cracked and therefore unsuitable for use, but still maintains overall part geometry such that a coating will accumulate on the component in the same manner as if it were not cracked. As described below, it is important to provide a minimum thickness of the ferrous powder, varying with probe (e.g., probe 52 of FIG. 2) resolution, to achieve an accurate MBC measurement. As discussed below with reference to FIG. 5, a minimum ferrous coating thickness of 0.14 mm is desirable. There can be no upper limit for thickness of the ferrous material coating due to the physics of induction probe inspecting. However, it can be undesirable for any coating to be too thick as thickness is directly related to process (spray) duration.

Figure 2:
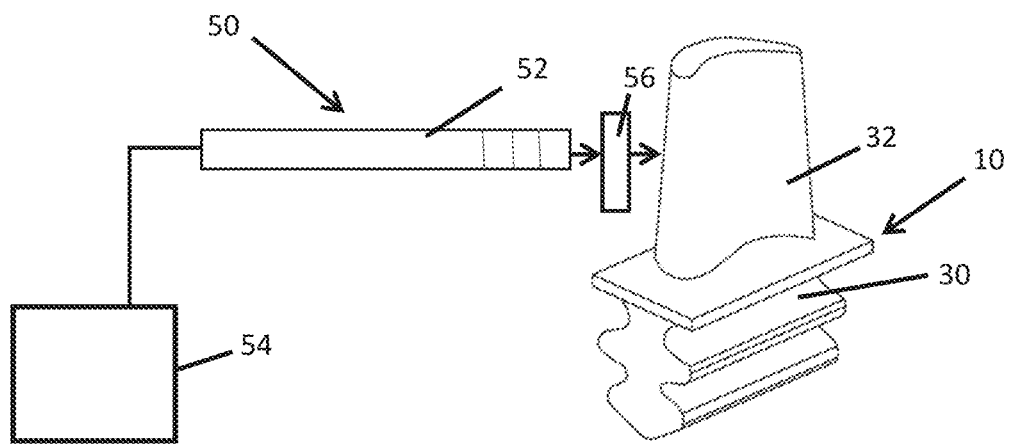
FIG. 2 is a schematic diagram illustrating the magnetic coating upon the gas turbine component of FIG. 1 being validated by an induction probe.

FIG. 2 is a schematic diagram illustrating validation of the ferrous coating. Inspection system 50 can comprise probe 52, and controller 54 Output of probe 52 can be read on an output device of controller 54, such a display screen. As a second step, application of the ferrous coating may be validated and/or induction probe 52 can be calibrated using a shim 56. Shim 56 can have a known, calibrated thickness. For example, the thickness of shim 56 can be measured, such as with a microscope or micrometer, and recorded for comparison with test measurements. Shim 56 can be made of any non-magnetic material. The material of shim 56 can be conductive but does not need to be. In practice, probe 52 can be calibrated on a daily basis when used, which is comparable to standard practice for both eddy current and magnetic induction probes. Thus, readings for the measured thickness indicated at controller 54, can match the known thickness of shim 56 to verify that a sufficient thickness of ferrous coating has been applied and that probe 52 is accurately functioning. Deviation in measurement of the known thickness of shim 56 indicates an area for which the thickness of ferrous coating is beneath an acceptable minimum or need for calibration of the probe 52. For example, measurement of the shim 56 by the probe 52 different from the known thickness of the shim 56 is indicative that the thickness of the ferrous coating is below an acceptable minimum for the effectiveness of probe 52, e.g., 0.14 mm.

Figure 3:
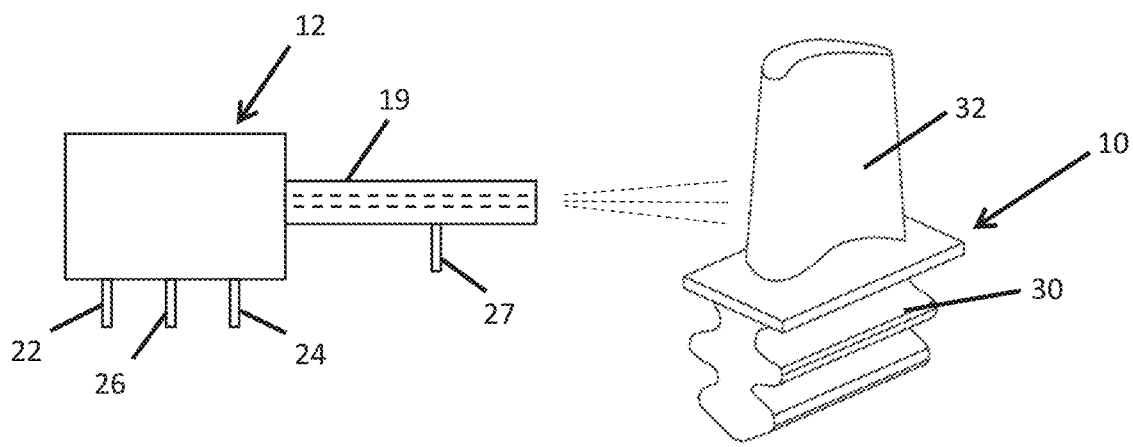
FIG. 3 is a schematic diagram illustrating the coated gas turbine component of FIG. 2 being sprayed with a metallic bond coating using the thermal spray gun.

FIG. 3 is a schematic diagram illustrating gas turbine component 10 of FIG. 2 being sprayed with an MBC using thermal spray gun 12. As a third step, the "representative" HGP component, either gas turbine component 10 or a facsimile thereof, can be coated with the MBC, using the same coating process parameters as used to apply the MBC to production components. The third step can occur along with a coating process for one or more actual production components of gas turbine component 10. For example, driver 20 of the spray system of FIG. 1 can be operated to move thermal spray gun 12 through a spray pattern programmed for gas turbine component 10 stored in storage system 40. For example, driver 20 can move thermal spray gun 12 along the same pattern of the programmed instructions to apply the MBC in a similar manner that the ferrous coating was applied. The spray pattern can be repeated for the "representative" HGP component and each of the actual production variations of gas turbine component 12 moved into or through spray booth 14.

Figure 4:
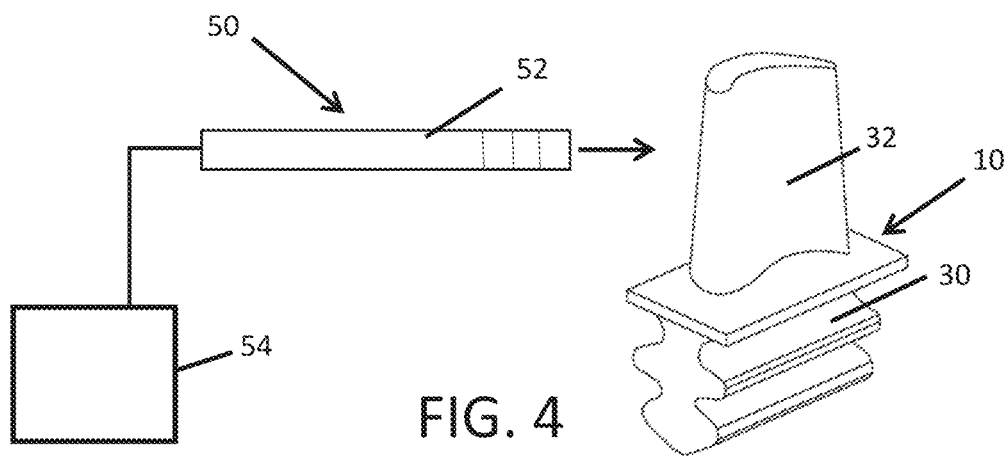
FIG. 4 is a schematic diagram illustrating the gas turbine component of FIG. 3 being inspected by the induction probe.

FIG. 4 is a schematic diagram illustrating gas turbine component 10 of FIG. 3 being inspected by induction probe 52. As a fourth step, magnetic induction probe 52 can be used to determine the MBC thickness upon the "representative" HGP component. Any magnetic induction probe can be used and the higher the resolution of the probe, the thinner the requirement of the magnetic base material (ferrous coating). Therefore, ferrous coating material and cycle time savings are achieved using a higher resolution probe. In an example, magnetic induction probe 52 can comprise a Fischer Technology FGA06H probe. Output of probe 52 can be read on an output device of controller 54 (FIG. 2). Output of probe 52 can provide an indication of the thickness of the MBC applied over the ferrous coating at the location of probe 52. Thus, probe 52 can be moved into various positions adjacent the "representative" HGP component to verify MBC thickness. The entirety of the "representative" HGP component can be measured, but does not need to be. Measurements can be made at the center of spray zones on flat, smooth or gently curved surfaces and at irregularly shaped portion of the component where too much coating might accumulate, or too little coating may reach during the spray process. Using this methodology, the programmed set of instructions for driver 20 can be updated to achieve minimum MBC and TBC consistently upon the entirety of the HGP component geometry. Uniformity of application of the MBC and TBC would benefit from such program adjustment.

At a fifth step, following measurement of MBC thickness, the MBC and ferrous coating of the "representative" HGP component can be removed. In examples, both the MBC and the ferrous coating can be chemically stripped by submerging the component in a chemical bath. Subsequently, the "representative" HGP component can be re-used for another batch of parts. These "representative" parts may also be used as production parts in a subsequent batch. That is, if a "scrap" part is not available, a production part can be used because the MBC and ferrous coatings and the chemical stripping processes do not degrade the part.

In an example of a verification process for the methods and systems described herein, FE-276-2 was used as an example ferrous coating. The example ferrous coating was applied to several coupons made from HASTELLOY® X alloy. Minimum acceptable thickness of the ferrous coating was confirmed by positioning a calibrated shim over the ferrous coating and verifying the shim thickness with a magnetic induction gage (e.g., probe 52). An example MBC of CO-210-24 (CoNiCrAlY) was next applied upon the ferrous-coated coupons. Each of the coupons was then measured metallurgically (e.g., with a microscope or micrometer) and with a magnetic induction gage (e.g., probe 52) to measure the TBC thickness. Results of the measurements of this verification process are shown and discussed with reference to FIGS. 5 and 6.

Figure 5:
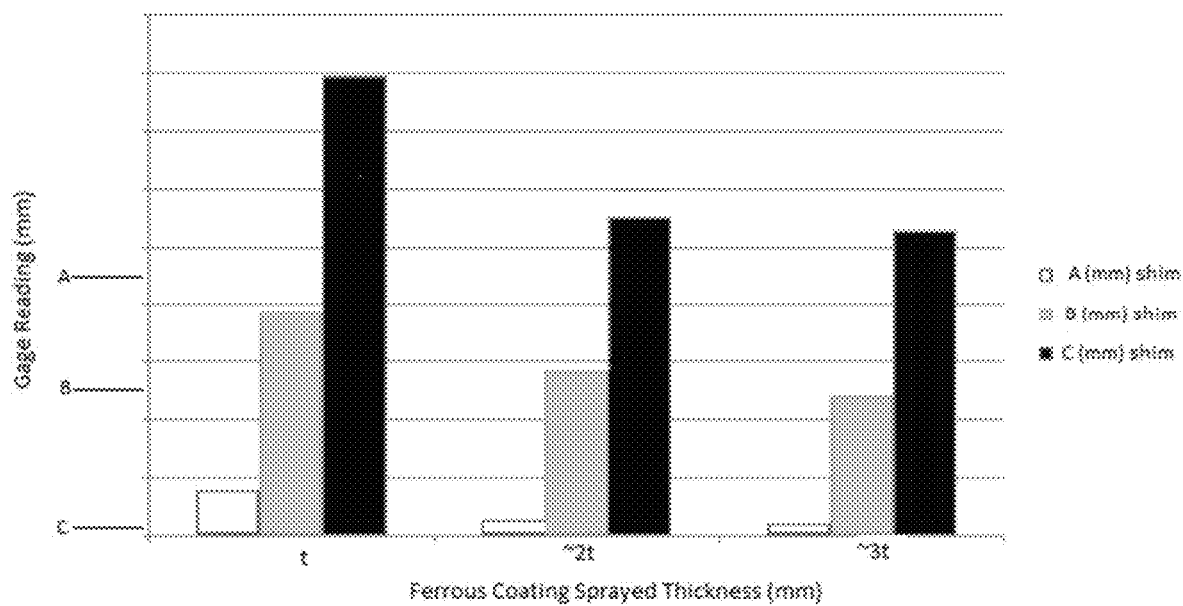
FIG. 5 is a chart illustrating data from different steps of calibrating a probe with a magnetic coating applied over a non-magnetic substrate.

FIG. 5 is a chart illustrating data from different steps of calibrating a probe with a magnetic coating applied over a non-magnetic substrate. The bar chart shown in FIG. 5 depicts nine different coupon measurement configurations: three shims A, B and C having different thicknesses being used to evaluate probe effectiveness for three different thicknesses of a ferrous coating on three different coupons. In the example, the coupons were made of HASTELLOY® X alloy, which comprises a non-magnetic base upon which to apply a ferrous coating. The ferrous coatings can be made from FE 726-2 material.

Shims A, B and C can have differing thicknesses. As shown in the left side of the bar chart, shim A can be thicker than shim B, and shim B can be thicker than shim C. The thicknesses of shims A, B and C can be verified, such as with a microscope or micrometer.

The coatings applied to the shims can have differing thicknesses of t, 2t and 3t. The thicknesses t, 2t and 3t can be verified, such as with a microscope or micrometer. Thickness 2t can be approximately twice as thick as thickness t, and thickness 3t can be approximately three times as thick as thickness t.

The thicknesses of the shims can be used identify sufficient ferrous coating thickness and calibrate a probe, such as probe 52 (FIG. 2). Note, that with respect to the testing of FIGS. 5 and 6, the probe was calibrated using a thickness of coating of 2t. As can be seen, the difference between the actual shim thickness A, B and C on the left-hand side and measured thickness indicated by the bars decreases as the thickness of ferrous coating increases. For typical anticipated MBC coating thicknesses, it is desired to identify a minimum ferrous coating thickness that is expected to provide sufficient accuracy. For the specific configuration tested, a minimum thickness of 0.14 mm was found to be effective for probe 52.

Figure 6:
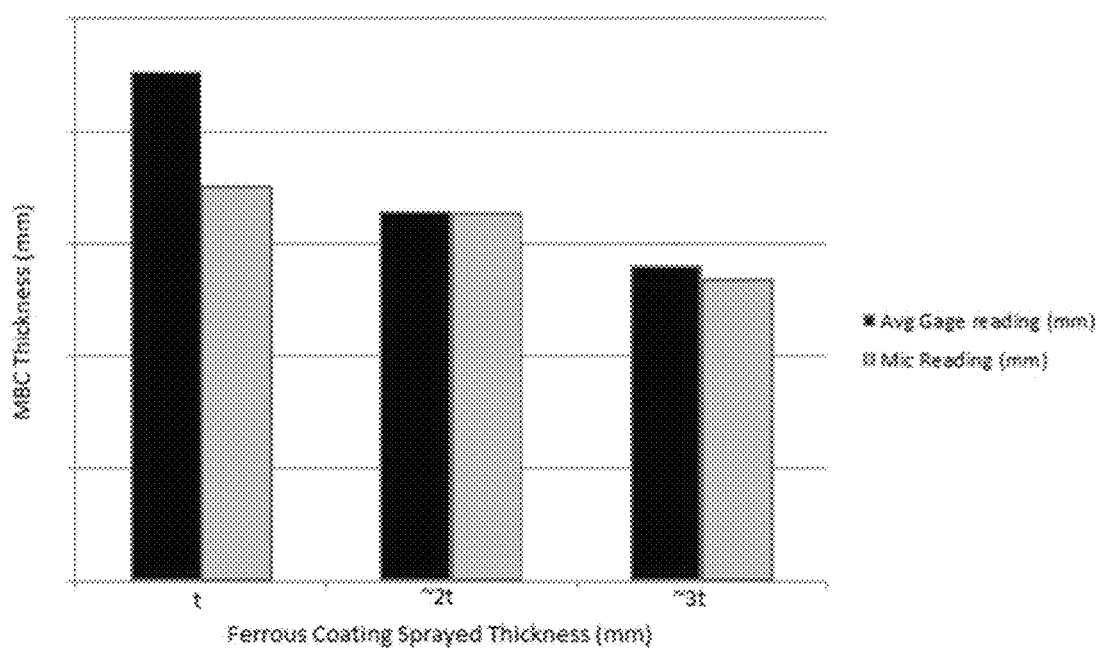
FIG. 6 is a chart illustrating data from different steps of measuring metallic bond coating thicknesses.

FIG. 6 is a chart illustrating data from different steps of measuring metallic bond coating thicknesses through a magnetic coating. The bar chart shown in FIG. 6 illustrates measurement of a TBC applied to ferrous sprayed coupons. Specifically, FIG. 6 shows three coupons of FIG. 5 each having one of thicknesses t, 2t and 3t of the ferrous coating applied thereto. CO-210-24 (CoNiCrAlY) was used as the non-magnetic MBC. The thickness of the MBC was verified by a microscope, indicated by the right bar for each of t, 2t and 3t. The microscope can be used to measure cross-sections of the coupons after the coupons have been cross-sectioned, such as by cutting the coupons in half to expose the coating thicknesses. Before the coupons are cross-sectioned, a probe, e.g., probe 52, was used to measure the thicknesses of the MBC. As can be seen, measurements of the probe are closer to the microscope measurements for larger thicknesses of the ferrous coating.

Additional testing was completed and showed that with multiple times measuring the coupons, the thicker ferrous sample (e.g., 3t) measures a tighter range within the microscope measurement. Note, that with respect to the additional testing, the probe was calibrated using a ferrous thickness of coating of 3t. Such testing determined that a ferrous coating thickness of 0.14 mm, or greater, yielded the most accurate magnetic induction gage accuracy, particularly for probe 52.

Figure 7:
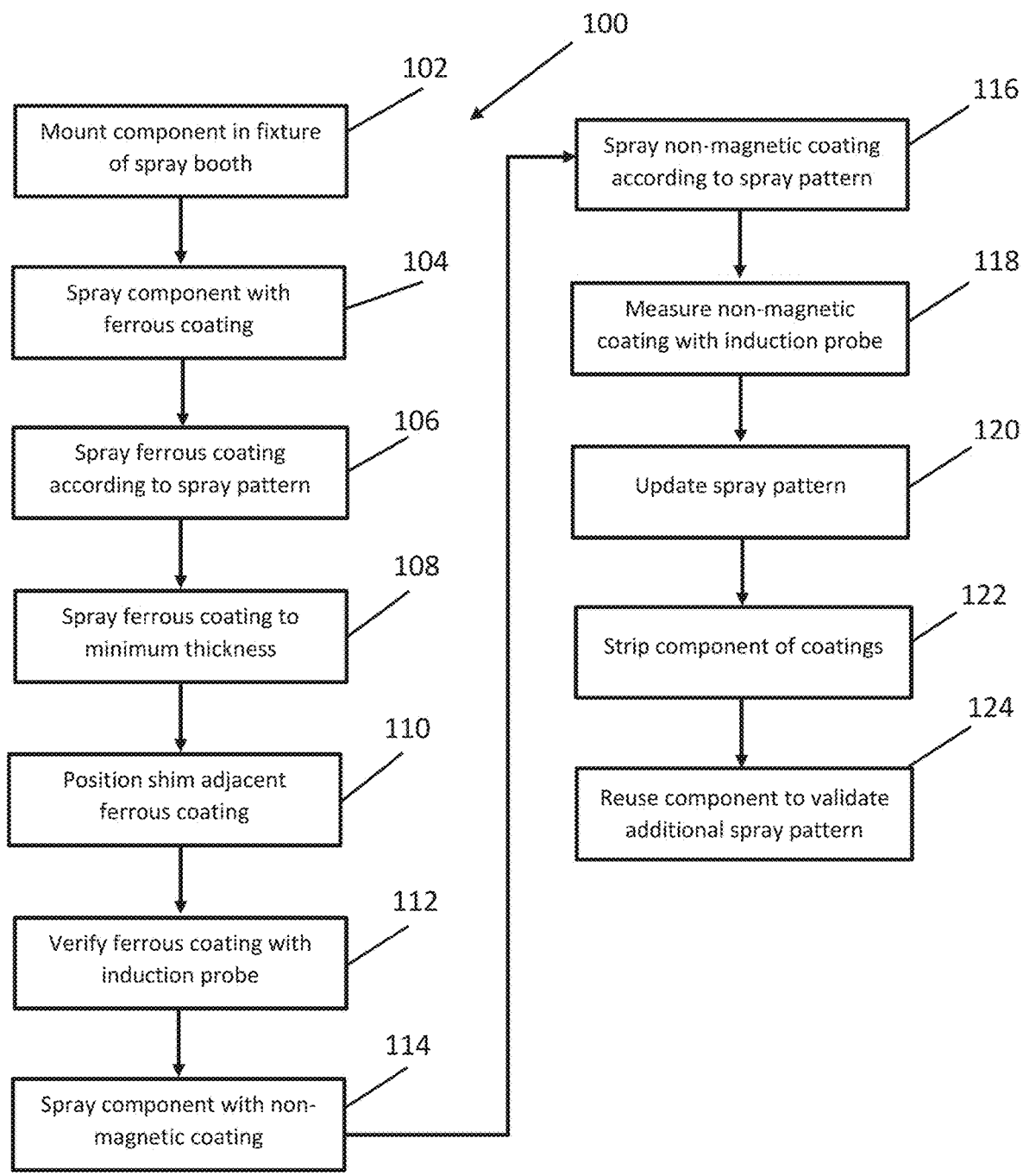
FIG. 7 is a line diagram illustrating a method for validating a spray process of a metallic bond coating applied over a magnetic coating.

FIG. 7 is a line diagram illustrating method 100 for validating a spray process of a metallic bond coating over a non-magnetic substrate.

At step 102, a gas turbine gas path component can be mounted in fixture of spray booth so as to be held in a known relationship to a thermal spray gun.

At step 104, the component can be sprayed with a ferrous coating.

At step 106, the ferrous coating can be sprayed according to a spray pattern wherein a robotic arm is moved over a predetermined pattern defined by a set of instructions for locations of the thermal spray gun in the spray booth, orientations of trajectories of the thermal spay gun at each location, and spray times for the thermal spray gun at each location.

At step 108, the ferrous coating can be applied to a minimum thickness to ensure compatibility with magnetic induction probe testing.

At step 110, a shim can be positioned adjacent the ferrous coating to facilitate calibration of a magnetic induction probe.

At step 112, the ferrous coating can be verified with the magnetic induction probe by taking measurements with the magnetic induction probe of the ferrous coating through the shim. Output of the magnetic induction probe can be compared to a known thickness of the shim to verify that the thickness of the ferrous coating is sufficient to enable the magnetic induction probe to accurately take readings.

At step 114, the component can be sprayed with a non-magnetic coating, such as a metallic bond coating. The non-magnetic coating can be applied over the magnetic coating.

At step 116, the non-magnetic coating can be applied according to the spray pattern used to apply the ferrous coating.

At step 118, the thickness of the non-magnetic coating can be measured with the magnetic induction probe. The magnetic induction probe can be moved over various portions of the component to verify that sufficient thickness of the metallic bond coating was applied. A sufficient thickness of the metallic bond coating can be determined as is necessary for the gas turbine component to properly function in a hot gas path of a gas turbine engine.

At step 120, the spray pattern used at steps 106 and 116 can be updated to alter the spray pattern to correct any deficiencies in the coating thicknesses measured at steps 112 and 118, thereby eliminating the deficiencies from arising in subsequent spraying operations.

At step 122, the component can be stripped of the coatings, such as by submerging the coated component in an appropriate chemical bath.

At step 124, the component can be reused to validate additional spray processes. For example, the component can be used to validate different spray patterns or can be used to verify the same spray pattern on processing of additional production parts.

In alternative examples of the present disclosure, a ferrous "representative" part could be used in lieu of a non-magnetic component coated with a ferrous coating. However, use of a ferrous "representative" part would be subject to corrosion. Also, a ferrous "representative" part would not be compatible with the chemical stripping process, and therefore not available for reuse.

In an additional alternative example, the TBC could be applied on top of the MBC and then the total thickness could be measured on the same representative part.

The methods and systems described herein allow for effective measurement of non-magnetic coatings upon non-magnetic substrates. The methods and systems can be used to confirm bond coat thickness in place of metallurgical testing on coupons or destructive measurement on, frequently expensive, HGP components. This saves unnecessary steps of cutting the components, the associated time-consuming step of sending samples to metrology labs, and applying of coupons to dummy HGP components.

The representative HGP component can be stripped using industry standard methods. This can dramatically reduce process validation for a batch of parts, as the MBC can be directly measured upon the representative HGP component, rather than spraying, detaching, and then sending the coupons to a laboratory for the further time-consuming metallurgical analysis.

The methods and systems described herein allow for a much more thorough check of part bond coat thickness. In particular, exact measurements of the thickness at the exact geometry over the entire surface of the representative part can be obtained, which is not possible using coupons. The thickness measurement can be made at any area of the part, not just at the locations simulated by coupons. Further, the "representative" HGP component can be an exact representation of the part geometry, in contrast to the coupon that is placed (e.g., welded) on top of the part and therefore represents a distortion of the part geometry at the location at which the coupon is placed.

The methods and systems described herein can be used for qualifying thickness if unable to weld coupons onto a part due to unavailability of dummy HGP components because the "representative" HGP component can be reused as an actual production HGP component, after stripping of both the TBC and ferrous coating before reuse.

The methods and systems described herein can be used on any non-magnetic coatings such as can be applied by both of APS and HVOF methods. For example, due to the geometry of combustion parts and the need to coat the inner diameter/gas path, the HVOF process cannot be used because the needed spray gun-to-part standoff distance must be, for example, greater than 10 inches (~25.4 cm). Thus, the APS process is the industry standard for large combustion parts which because spray standoff distances of only approximately 2.5 inches (~6.4 cm) can be used. Turbine blades and vanes are coated using HVOF or VPS (Vacuum Plasma Spray) which benefit from having a denser MBC microstructure than APS. Both APS and HVOF processes are important and having the ferrous spray powder available for both processes ensures this technique can be applied for all non-magnetic gas turbine parts needing MBC.

The methods and systems described herein can additionally use existing robotic spraying programs for a HGP component to apply the ferrous material.

VARIOUS NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein. For example, while an embodiment has been described with a driver and a mobile thermal spray gun, it will be appreciated that the scope of the disclosure is not so limited, and may apply to systems that include a driver and mobile part support in addition to or in place of the mobile thermal spray gun.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination The claimed invention is:

1. A method for measuring a non-magnetic coating thickness upon a non-magnetic gas turbine component, the method comprising:
    applying a magnetic coating upon the non-magnetic gas turbine component;
    applying a non-magnetic coating upon the magnetic coating; and
    measuring a thickness of the non-magnetic coating with a magnetic induction probe.

2. The method of claim 1, wherein the non-magnetic gas turbine component is a representative non-magnetic gas turbine component having a geometry equivalent to geometry of a plurality of non-magnetic gas turbine components.

3. The method of claim 1, further comprising removing the non-magnetic coating and the magnetic coating from the non-magnetic gas turbine component.

4. The method of claim 3, further comprising reusing the non-magnetic gas turbine component to measure another non-magnetic coating thickness applied thereto on top of another magnetic coating.

5. The method of claim 1, wherein the non-magnetic coating is applied according to a set of instructions configured to apply the non-magnetic coating to different surfaces of the gas turbine component.

6. The method of claim 5, wherein the magnetic coating is applied according to the set of instructions.

7. The method of claim 5, wherein the non-magnetic coating and the magnetic coating are applied using a robotic arm.

8. The method of claim 1, further comprising validating a thickness of the magnetic coating before applying the non-magnetic coating.

9. The method of claim 1, wherein the non-magnetic gas turbine component comprises a gas path component completely covered by the magnetic coating and the non-magnetic coating.

10. A method of inspecting a coating thickness of a gas turbine component, the method comprising:
    mounting the gas turbine component in a fixture;
    coating the gas turbine component with a ferrous coating; and
    validating the ferrous coating with a testing tool; wherein
    the gas turbine component comprises a non-magnetic, gas path component; and
    the testing tool comprises a magnetic induction probe.

11. The method of claim 10, further comprising:
    spraying a metallic bond coating with a thermal spray gun mounted to an articulating arm configured to move about the fixture.

12. The method of claim 11, further comprising measuring the metallic bond coating with the testing tool.

13. The method of claim 11, wherein the metallic bond coating is sprayed according to a programmed pattern so that the metallic bond coating covers a designated surface area of the gas turbine component.

14. The method of claim 13, wherein the programmed pattern is executed with an automated robotic arm.

15. The method of claim 13, wherein the ferrous coating and the metallic bond coating are applied according to the programmed pattern.

16. The method of claim 10, wherein the ferrous coating is applied to a thickness of 0.14 mm.

17. The method of claim 10, wherein validating the ferrous coating with a testing tool comprises:
    positioning a non-magnetic shim having a known thickness against the ferrous coating; and
    measuring the shim thickness between an induction probe and the ferrous coating.

18. The method of claim 10, further comprising:
    stripping the gas turbine component of the ferrous coating; and
    reusing the gas turbine component to validate another spray process.

19. The method of claim 10, wherein:
    the ferrous coating comprises FE-276-2; and
    the metallic bond coating comprises CoNiCrAlY.

20. A method of inspecting a coating thickness of a gas turbine component, the method comprising:
    mounting the gas turbine component in a fixture;
    coating the gas turbine component with a ferrous coating;
    validating the ferrous coating with a testing tool;
    stripping the gas turbine component of the ferrous coating; and
    reusing the gas turbine component to validate another spray process.

* * * * *